(12) United States Patent
Bergeron

(10) Patent No.: US 9,813,226 B2
(45) Date of Patent: Nov. 7, 2017

(54) MODELING A CLOCK

(71) Applicant: Ixia, Calabasas, CA (US)

(72) Inventor: Matthew R. Bergeron, Thousand Oaks, CA (US)

(73) Assignee: IXIA, Calabasas, CA (US)

( * ) Notice: Subject to any disclaimer, the term of this patent is extended or adjusted under 35 U.S.C. 154(b) by 135 days.

(21) Appl. No.: 14/819,337

(22) Filed: Aug. 5, 2015

(65) Prior Publication Data

US 2017/0041126 A1    Feb. 9, 2017

(51) Int. Cl.
*H04L 7/00* (2006.01)

(52) U.S. Cl.
CPC .................. *H04L 7/0012* (2013.01)

(58) Field of Classification Search
CPC ..................... H04L 76/023; H04L 7/0012
USPC ........................................... 370/503
See application file for complete search history.

(56) References Cited

U.S. PATENT DOCUMENTS

| | | |
|---|---|---|
| 6,868,069 B2 | 3/2005 | Knobbe et al. |
| 7,092,586 B2 | 8/2006 | Vokey et al. |
| 7,881,209 B2 | 2/2011 | Beliles, Jr. et al. |
| 8,718,482 B1 | 5/2014 | Roberts |
| 8,767,565 B2 | 7/2014 | Dalmau et al. |
| 9,130,945 B2 | 9/2015 | Smith et al. |
| 9,380,070 B1 | 6/2016 | Cain et al. |
| 2003/0105976 A1 | 6/2003 | Copeland, III |
| 2003/0200483 A1 | 10/2003 | Sutton |
| 2004/0190547 A1 | 9/2004 | Gordy et al. |
| 2007/0268938 A1 | 11/2007 | Dowd |
| 2009/0231191 A1 | 9/2009 | Wu et al. |
| 2011/0170534 A1 | 7/2011 | York |
| 2011/0199133 A1 | 8/2011 | Yamada |
| 2011/0211473 A1 | 9/2011 | Matityahu et al. |
| 2011/0268097 A1* | 11/2011 | Agrawala ............... G01S 5/021 370/338 |
| 2012/0166327 A1 | 6/2012 | Amicangioli |
| 2012/0275317 A1 | 11/2012 | Geva |
| 2013/0080817 A1 | 3/2013 | Mihelic |
| 2013/0094515 A1 | 4/2013 | Gura et al. |
| 2013/0173778 A1 | 7/2013 | Hsy et al. |

(Continued)

FOREIGN PATENT DOCUMENTS

| | | |
|---|---|---|
| WO | WO 2011/144263 A1 | 11/2011 |
| WO | WO 2016/168063 A1 | 10/2016 |

(Continued)

OTHER PUBLICATIONS

Non-Final Office Action for U.S. Appl. No. 14/685,552 (Oct. 20, 2016).

(Continued)

*Primary Examiner* — Ronald B Abelson

(74) *Attorney, Agent, or Firm* — Jenkins, Wilson, Taylor & Hunt, P.A.

(57) ABSTRACT

Methods, systems, and computer readable media for modeling a clock are disclosed. According to one exemplary method, the method occurs at a monitoring module associated with a first node. The method includes receiving packets from a second node, extracting timestamps from at least two of the packets, and generating, using the timestamps, clock related information for generating a local clock model indicative of a precision of a local clock at the first node relative to a clock at the second node.

18 Claims, 5 Drawing Sheets

(56) References Cited

U.S. PATENT DOCUMENTS

| | | | |
|---|---|---|---|
| 2013/0212439 A1 | 8/2013 | Stevens et al. | |
| 2013/0259049 A1 | 10/2013 | Mizrahi | |
| 2013/0265886 A1 | 10/2013 | Leong | |
| 2013/0278312 A1 | 10/2013 | Getzin et al. | |
| 2013/0329595 A1 | 12/2013 | Scholz | |
| 2013/0343207 A1 | 12/2013 | Cook et al. | |
| 2013/0347103 A1 | 12/2013 | Veteikis et al. | |
| 2014/0006610 A1 | 1/2014 | Formby et al. | |
| 2014/0185632 A1 | 7/2014 | Steiner et al. | |
| 2014/0297852 A1 | 10/2014 | Shimizu et al. | |
| 2014/0317288 A1 | 10/2014 | Krueger et al. | |
| 2014/0321285 A1 | 10/2014 | Chew et al. | |
| 2014/0344930 A1 | 11/2014 | Foley | |
| 2015/0016274 A1 | 1/2015 | Holland | |
| 2015/0023168 A1 | 1/2015 | Kotecha et al. | |
| 2015/0023170 A1 | 1/2015 | Kakadia et al. | |
| 2015/0281025 A1 | 10/2015 | Wallbaum et al. | |
| 2016/0065434 A1 | 3/2016 | Janakiraman | |
| 2016/0110211 A1 | 4/2016 | Karnes | |
| 2016/0285575 A1 | 9/2016 | Holmeide | |
| 2016/0301589 A1 | 10/2016 | Rata et al. | |
| 2016/0301599 A1 | 10/2016 | Porfiri et al. | |
| 2016/0306726 A1 | 10/2016 | Regev | |
| 2016/0309434 A1 | 10/2016 | Regev | |
| 2016/0315756 A1 | 10/2016 | Tenea et al. | |
| 2017/0085581 A1 | 3/2017 | Jackson | |

FOREIGN PATENT DOCUMENTS

| | | |
|---|---|---|
| WO | WO 2016/168064 A1 | 10/2016 |
| WO | WO 2017/052714 A1 | 3/2017 |

OTHER PUBLICATIONS

Non-Final Office Action for U.S. Appl. No. 14/688,630 (Oct. 17, 2016).

Non-Final Office Action for U.S. Appl. No. 13/933,661 (Sep. 27, 2016).

Notification of Transmittal of the International Search Report and the Written Opinion of the International Searching Authority, or the Declaration for International Application No. PCT/US2016/040523 (Sep. 12, 2016).

Notification of Transmittal of the International Search Report and the Written Opinion of the International Searching Authority, or the Declaration for International Application No. PCT/US2016/026534 (Jul. 8, 2016).

Notification of Transmittal of the International Searh report and the Written Opinion of the International Searching Authority, or the Declaration for International Application No. PCT/US2016/026533 (Jul. 8, 2016).

Final Office Action for U.S. Appl. No. 13/933,661 (Apr. 12, 2016).

Non-Final Office Action for U.S. Appl. No. 13/933,661 (Dec. 14, 2015).

Commonly-assigned, co-pending U.S. Appl. No. 14/860,630 for "Methods, Systems, and Computer Readable Media for Detecting Physical Link Intrusions," (Unpublished, filed Sep. 21, 2015).

Commonly-assigned, co-pending U.S. Appl. No. 14/685,552 for "Methods Systems, and Computer Readable Media for One-Way Link Delay Measurement," (Unpublished, filed Apr. 13, 2015).

"High Density Modular Fiber Tap," Ixia, http://www.ixiacom.com/products/net-optics-flex-tap, pp. 1-4 (Jul. 2014).

"Ixia Anue 3500—Mobile Backhaul Testing Solution," Ixia Data Sheet, pp. 1-5 (Dec. 2013).

Arnold, "What Are All of These IEEE 1588 Clock Types," http://blog.meinbergglobal.com/2013/10/21/ieee1588clocktypes/, News and Tutorials from Meinberg, pp. 1-6 (Oct. 21, 2013).

"AN-1838 IEEE 1588 Boundary Clock and Transparent Clock Implementation Using the DP83640," Application Report, Texas Instruments, pp. 1-9 (Apr. 2013).

"Network Time Protocol," Wikipedia, https://en.wikipedia.org/wiki/Network_Time_Protocol, pp. 1-7 (Jul. 3, 2015).

Commonly-assigned, co-pending U.S. Appl. No. 14/688,630 for "Methods, Systems, and Computer Readable Media for Synchronizing Timing Among Network Interface Cards (NICs) in a Network Equipment Test Device," (Unpublished, filed Apr. 16, 2015).

Commonly-assigned, co-pending U.S. Appl. No. 14/688,644 for "Methods, Systems, and Computer Readable Media for Emulating Network Devices with Different Clocks," (Unpublished, filed Apr. 16, 2015).

Spirent, "Precision Time Protocol (PTP) IEEE 1588," YouTube "alantalkstech", https://www.youtube.com/watch?v=yw-gd01aOYg, pp. 1-11 (Dec. 7, 2011).

Eidson, "IEEE-1588 Standard for a Precision Clock Synchronization Protocol for Networked Measurement and Control Systems—A Tutorial," Agilent Technologies, pp. 1-94 (Oct. 2005).

Non-Final Office Action for U.S. Appl. No. 14/809,513 (May 30, 2017).

Notice of Allowance and Fee(s) Due for U.S. Appl. No. 14/688,630 (Apr. 12, 2017).

Commonly-assigned, co-pending, U.S. Appl. No. 15/482,672 for "Methods, Systems, and Computer Readable Media for Monitoring, Adjusting, and Utilizing Latency Associated With Accessing Distributed Computing Resources," (Unpublished, filed Apr. 7, 2017).

Notice of Allowance and Fee(s) Due for U.S. Appl. No. 14/685,552 (Mar. 1, 2017).

Notice of Allowance and Fee(s) Due for U.S. Appl. No. 13/933,661 (Feb. 17, 2017).

Notification of Transmittal of the International Search Report and the Written Opinion of the International Searching Authority, or the Declaration for International Application No. PCT/US2016/040532 (Sep. 12, 2016).

Commonly-assigned, co-pending International Application No. PCT/US16/40532 for "Methods, Systems, and Computer Readable Media for Detecting Physical Link Intrusions," (Unpublished, filed Jun. 30, 2016).

"External Bypass Switches," Ixia, White Paper, 915-6688-01 Rev. B, pp. 1-5 (Dec. 2015).

Watt et al., "Understanding and Applying Precision Time Protocol," 14th Annual Clemson Univeristy Power Systems Conference, pp. 1-7 (Mar. 2015).

Non-Final Office Action for U.S. Appl. No. 14/860,360 (Dec. 19, 2016).

* cited by examiner

| CLOCK ID | SCALE FACTOR | PHASE OFFSET | CONFIDENCE VALUE | PACKET ID | UPDATE FLAG |
|---|---|---|---|---|---|
| SUT 1 | 500 | -2200 | 95 | SEQ NUMBER + HASH | NO |
| SUT 2 | 400 | -4598 | 80 | SEQ NUMBER + TS VALUE | NO |
| SUT 3 | 100 | 200 | 40 | SEQ NUMBER + TS VALUE | YES |
| SUT 4 | 1000 | -200 | 25 | HASH + TS VALUE | YES |

FIG. 4

MODELING A CLOCK

TECHNICAL FIELD

The subject matter described herein relates to clock related measurements. More specifically, the subject matter relates to methods, systems, and computer readable media for modeling a clock.

BACKGROUND

Network operators typically test network nodes for reliability and other characteristics before deploying the network nodes in live (e.g., non-test) networks. While testing a network node before deployment may be beneficial, scenarios exist where testing a network node in a live network is useful and/or necessary, e.g., for detecting and/or resolving previously undetected issues.

Traffic related measurements, such as one-way latency and jitter, are typically dependent on clock synchronization between two endpoints, e.g., a sender node and a receiver node. However, each endpoint may include clocks of varying precision. For example, a sender node may use a low precision clock (e.g., a clock that is precise to one millisecond) and a receiver clock may use a higher precision clock (e.g., a clock that is precise to one microsecond) than a receiver node. In this example, even if both clocks are accurate (e.g., in relation to an official time source and their individual precision), timestamps associated with one or more of the clocks may not provide enough precision and/or accuracy for performing one or more traffic related measurements, such as a one-way latency measurement.

Accordingly, a need exists for improved methods, systems, and computer readable media for modeling a clock.

SUMMARY

Methods, systems, and computer readable media for modeling a clock are disclosed. According to one exemplary method, the method occurs at a monitoring module associated with a first node. The method includes receiving packets from a second node, extracting timestamps from at least two of the packets, and generating, using the timestamps, clock related information for generating a local clock model indicative of a precision of a local clock at the first node relative to a clock at the second node.

According to one exemplary system, the system includes at least one memory and a monitoring module (MM) associated with a first node. The MM is implemented using the at least one memory. The MM is configured to receive packets from a second node, extract timestamps from at least two of the packets, and generate, using the timestamps, clock related information for generating a local clock model indicative of a precision of a local clock at the first node relative to a clock at the second node.

The subject matter described herein may be implemented in software in combination with hardware and/or firmware. For example, the subject matter described herein may be implemented in software executed by a processor. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computing platform or may be distributed across multiple devices or computing platforms.

As used herein, the term 'node' refers to a physical computing platform including one or more processors (e.g., hardware-based processors), network interfaces, and memory.

As used herein, the term 'clock' refers to any entity (e.g., software, hardware, and/or firmware) for generating an indication of time.

As used herein, each of the terms 'function', 'engine', and 'module' refers to hardware, firmware, or software in combination with hardware and/or firmware for implementing features described herein.

BRIEF DESCRIPTION OF THE DRAWINGS

The subject matter described herein will now be explained with reference to the accompanying drawings of which:

FIG. 4 is a table illustrating exemplary data associated with modeling a clock according to an embodiment of the subject matter described herein.

DETAILED DESCRIPTION

Figure 1:
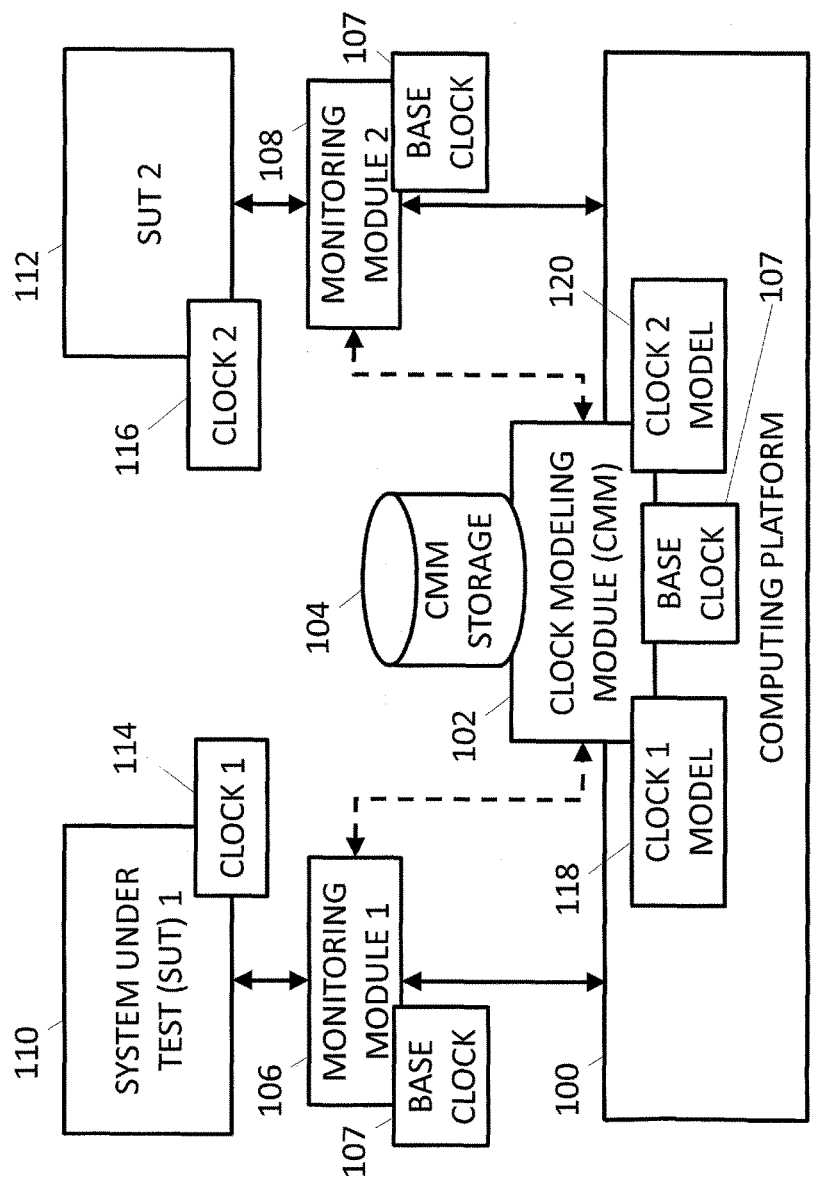
FIG. 1 is a block diagram illustrating an exemplary computing platform for modeling a clock according to an embodiment of the subject matter described herein.

The subject matter described herein includes methods, systems, and computer readable media for modeling a clock. When preparing to test network nodes, test operators typically need to synchronize clocks of test nodes and a test platform to accurately determine and/or measure traffic related statistics. For example, a receiver node (e.g., a device or endpoint) for receiving streaming traffic may be responsible for performing various traffic related measurements, such as measuring one-way latency or jitter. To perform an accurate traffic related measurement, a receiver node may need to perform clock synchronization with one more sender nodes that send the streaming traffic. However, issues can arise when a clock associated with a sender node is less precise than a clock associated with a receiver node and vice versa. In particular, clocks of varying precisions may generate timestamps and/or other information that yield less than optimal traffic related measurements, such as a one-way latency measurement.

In accordance with some aspects of the subject matter described herein, techniques for modeling a clock or aspects thereof may be provided. For example, a sender node may insert a transmit timestamp, based on a clock at the sender node, into each egress packet. In this example, a monitoring device may monitor egress packets (e.g., packets sent from the sender node) and may periodically or aperiodically (e.g., dynamically or continuously) generate and send clock related information usable for modeling a clock associated with the sender node to a receiver node or another entity for modeling the clock associated with the sender node.

In accordance with some aspects of the subject matter described herein, techniques for using a clock model or aspects thereof for performing one or more traffic related measurements may be provided. For example, when a receiver node (e.g., a test system) receives a packet containing a 'time-of-transmit' timestamp associated with a relatively low precision clock of a sender node, a 'time-of-receipt' timestamp associated with a relatively high precision clock of the receiver node may be generated. In this example, the receiver node may extract the 'time-of-transmit' timestamp from the packet and may apply a clock model so as to generate an adjusted 'time-of-transmit' timestamp that is correlated with the receiver node's high precision clock. By computing the delta between the 'time-of-receipt' high precision timestamp and the generated adjusted high precision timestamp, a one-way latency measurement or other traffic related measurement may be more precise and/or accurate.

Advantageously, in accordance with some aspects of the subject matter described herein, mechanisms may be provided for implementing a clock model and/or for correlating (e.g., adjusting) timestamps associated with a first clock to a second clock. By using a clock model and/or timestamp correlation, precision and/or accuracy of traffic related measurements may be improved over conventional methods. Further, by generating clock models that can be implemented in various nodes, a distributed traffic measurement system may be implemented whereby various traffic measurements, including one-way latency, can be performed without requiring that all packets being sent to a single entity.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a block diagram illustrating an exemplary computing platform 100 for modeling a clock according to an embodiment of the subject matter described herein. Referring to FIG. 1, computing platform 100 may represent a node or device that includes functionality for testing various aspects of system under test (SUT) 110, SUT 112, and/or other nodes. For example, computing platform 100 may receive traffic generated by SUT 112 and may perform traffic related measurements, such as jitter and one-way latency, associated with the traffic from SUT 112.

In some embodiments, computing platform 100 may include a base clock 107. Base clock 107 may represent any suitable entity for generating an indication of time. In some embodiments, base clock 107 may be a high precision clock (e.g., relative to other clocks at SUT 110 and/or 112). In some embodiments, base clock 107 may be synchronized with, shared with, and/or implemented by various modules, nodes, and/or entities associated with computing platform 100. For example, base clock 107 may be implemented by monitoring nodes 106 and 108.

In some embodiments, computing platform 100 may include functionality for communicating with various entities. For example, computing platform 100 may provide a communications interface or console for communicating with a user. In some embodiments, a user may include an automated system or may be controlled or controllable by a human user. In some embodiments, a user may select and/or determine traffic related measurements to perform, clock modeling preferences, and/or other configurations via one or more user interfaces associated with computing platform 100.

In some embodiments, each of SUTs 110 and 112 may represent a network device, a network module, a node, or a system of devices, nodes, and/or modules. For example, SUT 110 may be an endpoint located in a network (e.g., a private test network, a public network, or an enterprise network). In some embodiments, each of SUTs 110 and 112 may be a single node or may include functionality distributed across multiple computing platforms or nodes.

In some embodiments, each of SUTs 110 and 112 may represent one or more virtual machines (VMs) executing at one or more computing platforms. For example, SUT 110 may include three VMs, where each VM sends test traffic to computing platform 100.

In some embodiments, each of SUTs 110 and 112 may include or access a clock, such as clock 114 or clock 116. Each of clocks 114 and 116 may represent any entity (e.g., software, hardware, and/or firmware) for generating an indication of time. For example, each of clocks 114 and 116 may include an oscillator that operates at a particular frequency as well as software for generating timestamps based on oscillator clock pulses and a start time or an epoch. In another example, clock 114 may generate timestamps for packets sent from SUT 110 and clock 116 may generate timestamps for packets sent from SUT 112.

In some embodiments, each of clocks 114 and 116 may be less precise than one or more other clocks, e.g., a clock at computing platform 100. For example, where SUTs 110 and 112 include VMs, each VM may include a software-implemented clock that has a precision on the order of 16 milliseconds (ms), while computing platform 100 may have a clock with microsecond (µs) precision.

In some embodiments, computing platform 100, SUT 110, and/or SUT 112 may communicate with each other and/or other entities. For example, SUTs 110 and 112 may be web servers or other entities that communicate with each other via a network. In this example, computing platform 100 may be a monitoring device for monitoring traffic between SUTs 110 and 112. In another example, each of SUTs 110 and 112 may be web servers or other entities that communicate with computing platform 100.

In some embodiments, computing platform 100 therein may include functionality for performing various traffic related measurements. For example, computing platform 100 may receive a packet from SUT 112 and may perform a one-way latency measurement and/or a jitter measurement. In this example, timestamps and/or other clock related information may be usable for performing the measurements.

In some embodiments, computing platform 100 may include functionality for correlating timestamps associated with different clocks when performing various measurements. For example, computing platform 100 may receive a packet containing a 'time-of-transmit' timestamp based on clock 114. In this example, at the time of receipt, computing platform 100 may generate a 'time-of-receipt' timestamp based on a clock at computing platform 100. Continuing with this example, computing platform 100 may adjust one or more of these timestamps (e.g., using a correlated clock model) such that traffic measurements performed by computing platform 100 are more precise and/or accurate.

In some embodiments, computing platform 100 may include, utilize, and/or access a clock modeling module (CMM) 102, also referred to as clock modeling system (CMS) and a clock modeling engine (CME). CMM 102 may represent any suitable entity or entities (e.g., a computing platform, software executing on a processor, a logic device, a module, a complex programmable logic device (CPLD), a field-programmable gate array (FPGA), and/or an application specific integrated circuit (ASIC)) for performing one or more aspects associated with clock modeling.

In some embodiments, CMM 102 may include one or more communications interfaces for communicating with monitoring modules 106 and 108. Each of monitoring modules 106 and 108 may represent any entity (e.g., software, hardware, and/or firmware) for monitoring and/or copy packets and/or information therein. For example, monitoring module 106 may act as a probe or tap device and may copy packet information as packets (e.g., from or to SUT 110) traverse monitoring module 106 and monitoring module 108 may act as a probe or tap device and may copy packet information as packets (e.g., from or to SUT 112) traverse monitoring module 108.

In some embodiments, monitoring modules 106 and 108 may monitor VMs associated with SUTs 110 and 112. For example, monitoring module 106 may represent a probe that monitors packets sent from a VM that uses a software implemented clock for packet timestamps.

In some embodiments, monitoring modules 106 and 108 may include or access base clock 107. In some embodiments, each base clock 107 associated with monitoring modules 106 and 108 may be periodically or aperiodically (e.g., dynamically) synchronized with a base clock 107 at computing platform 100 or another entity. For example, a common time source and a clock synchronization technique may be used to periodically synchronize base clocks 107 associated with various entities in FIG. 1.

In some embodiments, monitoring modules 106 and 108 may include functionality for performing passive monitoring and/or active monitoring. For example, when performing passive monitoring, monitoring modules 106 and 108 may inspect traversing packets and may copy packets without modifying information therein and/or without affecting the flow of the original traffic. In another example, when performing active monitoring, monitoring modules 106 and 108 may inspect traversing packets and may modify information therein, e.g., adding, replacing or removing timestamps in the packet, and/or may affect the flow of the original traffic.

In some embodiments, monitoring modules 106 and 108 may include functionality for receiving commands or instructions from computing platform 100, CMM 102, and/or other entities. For example, CMM 102 may instruct monitoring modules 106 and 108 to perform enhanced monitoring actions. Exemplary monitoring actions may include monitoring packets associated with a particular VM, a user, a session, a network, and/or based on other criteria.

In some embodiments, base clocks 107 associated with computing platform 100 and monitoring modules 106 and 108 may be more precise than clocks 114 and 116. For example, clock 114 may have a precision on the order of ms, while base clock 107 associated with monitoring module 106 may have a precision on the order of 100 µs. In this example, clock 114 has $\frac{1}{10}^{th}$ the precision of base clock 107 associated with monitoring module 106

In some embodiments, monitoring modules 106 and 108 may analyze packets or information therein for determining clock related information usable for modeling a clock. Exemplary clock related information may include includes a clock period scale factor value and a relative phase offset value for correlating the first clock and the second clock. For example, monitoring module 106 may monitor packets sent from SUT 110 and may attempt to correlate timestamps (e.g., based on clock 114) in the packets with base clock 107 associated with monitoring module 106. In this example, monitoring module 106 may calculate a clock period scale factor value by measuring how many clock periods (e.g., smallest clock increments) of base clock 107 occurred during a single clock period of clock 114 as indicated by an incremental change in timestamps of monitored packets from the SUT 110. Additional exemplary correlation details are disclosed below with regard to FIG. 2.

In some embodiments, after gathering and/or generating clock related information, monitoring modules 106 and 108 may send the clock related information to CMM 102 and/or computing platform 100. In some embodiments, CMM 102 and/or computing platform 100 may use the clock related information for implementing and/or recalibrating a clock model. For example, CMM 102 may receive clock related information about clock 114 (e.g., from monitoring module 106) and may implement a corresponding clock model 118. In another example, CMM 102 may receive clock related information about clock 116 (e.g., from monitoring module 108) and may implement a corresponding clock model 120.

In some embodiments, each of clock models 118 and 120 may represent any suitable entity for implementing or providing a linear model or a piecewise linear model of a remote clock (e.g., a clock not at the implementing node). For example, as more recent clock related information is received, clock model 118 may be periodically or aperiodically adjusted and/or reconfigured to resemble clock 114. In this example, clock model 118 may provide a substantially linear approximation of the time at clock 114.

In some embodiments, clock model 118 may represent a higher precision version of clock 114 and/or clock model 120 may represent a higher precision version of clock 116. For example, computing platform 100 and/or a related entity may use clock model 118 to add additional precision to a timestamp associated with clock 114. In this example, clock model 118 may represent a linear model associated with a slope intercept formula $y=mx+b$ (e.g., adjusted_timestamp=scale_factor*original_timestamp+offset_value).

In some embodiments, computing platform 100 and/or a related entity may use clock models 118 and 120 for performing more precise and/or accurate traffic related measurements. For example, clock model 120 may be used to generate, adjust, or recreate timestamps associated with clock 116. In this example, assuming computing platform 100 receives a packet containing a 'time-of-transmit' timestamp of '3453' associated with clock 116, computing platform 100 may use clock model 120 to increase the precision of the 'time-of-transmit' timestamp and may adjust the timestamp from '3453' to '3452.978'. Continuing with this example, computing platform 100 and/or a related entity may use this adjusted timestamp along with one or more other timestamps from more precise clocks when performing various traffic related measurements.

In some embodiments, computing platform 100, CMM 102, and/or a related entity may compute confidence values for indicating how likely a clock model is to be accurate.

In some embodiments, computing platform 100, CMM 102, and/or a related entity may initiate actions for enhance or additional monitoring. For example, computing platform 100, CMM 102, and/or a related entity may compare measurements to predetermined threshold values. In this example, if measurements meet or exceed the threshold values, computing platform 100, CMM 102, and/or a related entity may trigger one or more monitoring performance actions.

In some embodiments, a monitoring performance action may include instructing a monitoring module 106 to identify particular packets as they traverse monitoring module 106 and to send packet identifying information (e.g., a packet hash, a timestamp value, a sequence ID, and/or other unique identifiers) to computing platform 100, CMM 102, and/or a related entity for identifying (e.g., disambiguating) the particular packets at computing platform 100 and for generating more precise clock models and/or timestamps. For example, when monitoring module 106 is performing passive monitoring, monitoring module 106 may identify a packet for deriving clock related information. In this example, monitoring module 106 may generate a virtual tag (e.g., packet identifying information based on unique information in the packet) and may send the virtual tag, e.g., via a management network, from monitoring module 106 to computing platform 100, CMM 102, and/or a related entity. In this example, computing platform 100, CMM 102, and/or a related entity may use the received virtual tag for identifying (e.g., disambiguating) the particular packets and extracting or deriving relevant information usable for generating more precise clock models and/or timestamps. In another example, when monitoring module 106 is performing active monitoring, monitoring module 106 may generate a virtual tag and may incorporate the virtual tag into the packet before sending the packet from monitoring module 106 to computing platform 100, CMM 102, and/or a related entity.

In some embodiments, a monitoring performance action may include instructing a monitoring module 106 to modify particular packets as they traverse monitoring module 106. For example, monitoring module 106 may use modify layer 4-7 timestamp values and/or other parameters. In this example, monitoring module 106 may add additional information (e.g., a hardware implemented layer 4 timestamp parameter value) to the packet for improving precision and/or other purposes.

In some embodiments, a monitoring performance action may include instructing a monitoring module 106 to monitor and/or modify particular packets associated with a particular user, VM, or session. For example, a user may experience various latency issues and may report these issues to a network operator. In this example, the network operator may instruct, via computing platform 100 or CMM 102, monitoring module 106 and 108 to generate high precision timestamps as the packets traverse monitoring module 106 and 108 and provide these high precision timestamps to CMM 102. Continuing with this example, CMM 102 may compare these high precision timestamps with timestamps that were stored in these packets (e.g., a less precise clock) and may perform adjustments to a relevant clock model at computing platform 100.

In some embodiments, computing platform 100 and/or CMM 102 may include functionality for storing and/or maintaining clock related information (e.g., clock identifiers (IDs), clock period scale factor values, relative phase offset values, confidence values, packet IDs, and/or update flags) for one or more clocks. For example, CMM 102 at computing platform 100 may maintain clock related information, such as a clock period scale factor value and a relative phase offset value, for each of a plurality of clock models, such as clock models 118 and 120. In some embodiments, CMM 102 may store clock related information and/or other information at CMM storage 104.

CMM storage 104 may represent any suitable entity (e.g., a non-transitory computer readable medium or a memory device) for storing clock related information and/or other information. Exemplary data stored at CMM storage 104 may include traffic related information, traffic related measurements, timers related to clock leases, clock related information (e.g., clocks associated with one or more nodes), clock synchronization preferences or settings, clock drift algorithms, and/or other information.

In some embodiments, CMM storage 104 may be integrated with or accessible by CMM 102, computing platform 100, or modules therein. In some embodiments, CMM storage 104 may be located at a node distinct from CMM 102 or computing platform 100.

It will be appreciated that FIG. 1 is for illustrative purposes and that various nodes, their locations, and/or their functions described above in relation to FIG. 1 may be changed, altered, added, or removed. For example, some nodes (e.g., CMM 102 and monitoring module 106) and/or functions described herein may be combined into a single entity.

Figure 2:
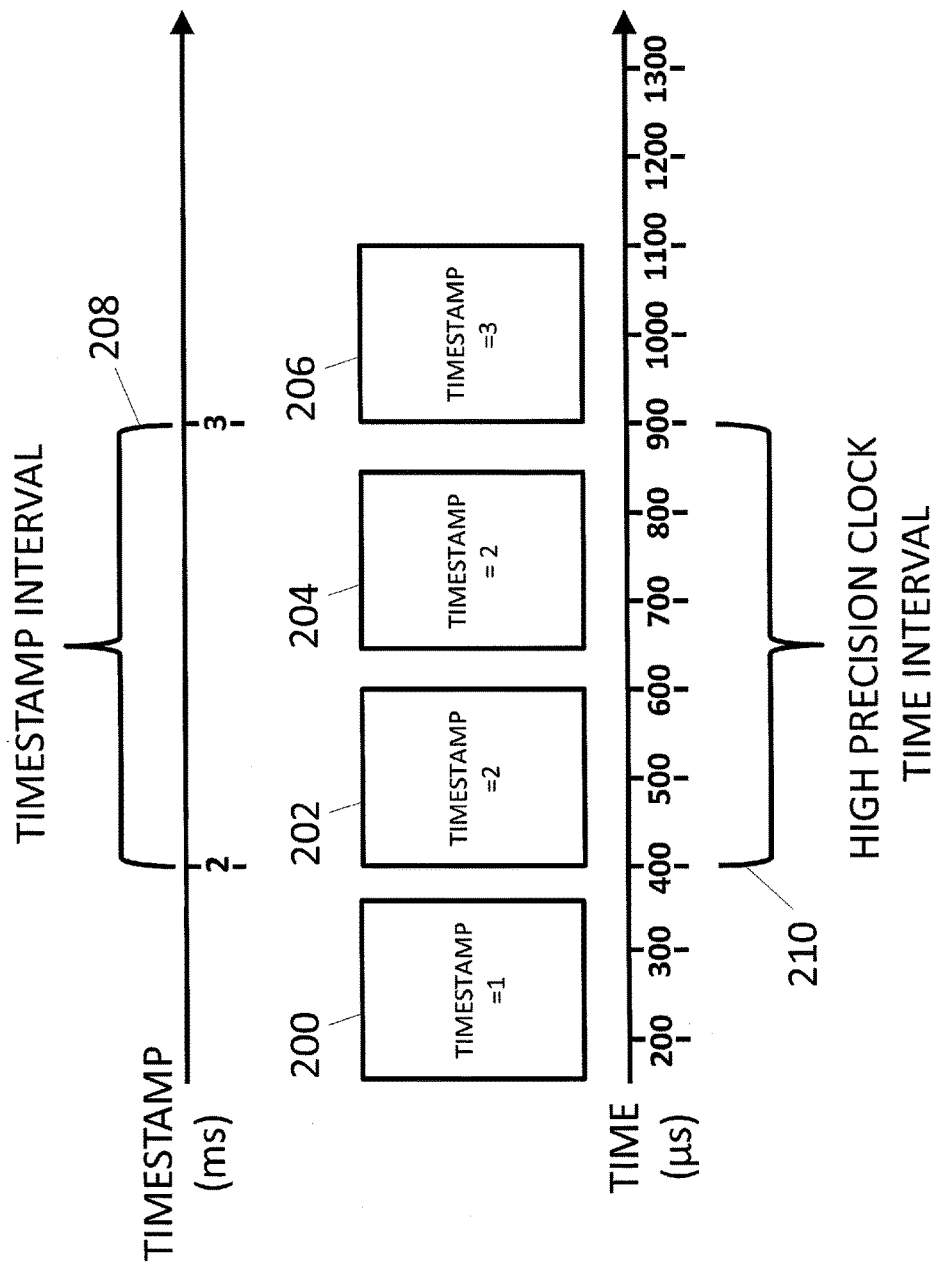
FIG. 2 is a timing diagram illustrating exemplary packets associated with modeling a clock according to an embodiment of the subject matter described herein.

FIG. 2 is a timing diagram illustrating exemplary packets associated with modeling a clock according to an embodiment of the subject matter described herein. In some embodiments, monitoring modules 106 and 108 may monitor packets sent from SUTs 110 and 112. In some embodiments, packets may be monitored for obtaining and/or deriving clock related information usable to implement a clock model associated with clock 114 and/or clock 116.

In some embodiments, each base clock 107 associated with monitoring modules 106 and 108 may represent a high precision clock, e.g., a clock having a higher precision than clock 114 or clock 116. In some embodiments, monitoring modules 106 and 108 may use base clocks 107 when determining a clock period scale factor value and/or a relative phase offset value associated with clock models 118 and 120. In some embodiments, base clocks 107 associated with monitoring modules 106 and 108 may be synchronized using a central time server or other mechanisms and may also be synchronized with a clock (e.g., at a receive port) at computing platform 100.

Referring to FIG. 2, monitoring module 106 may be configured to compute a clock period scale factor value by comparing timestamp values in packets 200-206 from SUT 110 to a high precision clock time values (e.g., clock ticks associated with base clock 107). Each of packets 200-206 may include a timestamp parameter value (e.g., a transmission control protocol (TCP) timestamp value) indicating a number of ms that have elapsed since a particular reference time.

Clock related timestamp interval 208 may represent an amount of time between a change or increment in a timestamp parameter value in monitored packets. Clock related timestamp interval 208 may be usable in computing or determining a clock period scale factor value and/or other related information. In some embodiments, monitoring module 106 may attempt to identify two packets that most accurately represent one or more intervals or increments in time by detecting a change in timestamp parameter values among packets 200-206. For example, monitoring module 106 may select packet 202 by identifying, in a stream of packets, the first packet to include a timestamp that has incremented by one from an immediately preceding packet. In this example, after identifying packet 202, monitoring module 106 may identify packet 206 by identifying, in a stream of subsequent packets after packet 200, the first packet to include a timestamp that has incremented by 1 from packet 200. As depicted in FIG. 2, clock related timestamp interval 208 may be one, e.g., the absolute difference between the timestamp parameter value of packet 202 (e.g., timestamp=2) and the timestamp parameter value of packet 206 (timestamp=3).

High precision clock time interval 210 may represent an amount of time that has occurred during timestamp interval 208. For example, monitoring module 106 may use base clock 107 (e.g., a high precision clock) to determine that an amount of time between packet 202 and packet 206. As depicted in FIG. 2, high precision clock time interval 210 may be 500, e.g., the absolute difference between when packet 202 traversed (e.g., 400 μs) monitoring module 106 and when packet 206 arrived (e.g., 900 μs) monitoring module 106.

In some embodiments, a clock period scale factor value may be computed by dividing high precision clock time interval 210 by timestamp interval 208. For example, assuming high precision clock time interval 210 is 500 and timestamp interval is 1, then a scale factor value is 500, e.g., (500/1=500). In this example, the computed scale factor value may indicate that for about every 1 ms that elapses at clock 114 500 μs elapses at base clock 107 associated with monitoring module 106.

In some embodiments, after determining a clock period scale factor value, a relative phase offset value may be computed. For example, a relative phase offset value may be computed by solving for b in a slope intercept formula y=mx+b, where y is a higher precision timestamp, m is a scale factor value, x is a current (lower precision) timestamp, and b is the relative phase offset value. In this example, when solving for the relative phase offset value, the slope intercept formula may be rewritten as b=y−mx. As depicted in FIG. 2, using a timestamp parameter value (x=3) and related high precision timestamp (y=900) associated with packet 206 and a scale factor value of 500 (m=500), a relative phase offset value may be computed to be −600, e.g., 900−(500*3)=−600.

In some embodiments, after determining a clock period scale factor value and a relative phase offset value, monitoring module 106 may provide this information and/or other clock related information to CMM 102 for implementing a clock model. For example, after determining a clock period scale factor value and a relative phase offset value related to clock 114, monitoring module 106 may send the information to CMM 102 for implementing clock model 118.

In some embodiments, various techniques for averaging or smoothing out jitter and/or other anomalies in clock related information may be utilized. For example, a digital filter may be used to smooth out the ticks of clock 114 and/or a high precision clock associated with monitoring module 106

It will be appreciated that FIG. 2 is for illustrative purposes and that additional and/or different information may use for determining or deriving clock related information. For example, while a clock period scale factor value may be determined using packets 202 and 206, a clock period scale factor value and/or a relative phase offset value may be determined using other packets, such as packets 200 and 204, packets 204 and 206, or packets 200 and 206.

Figure 3:
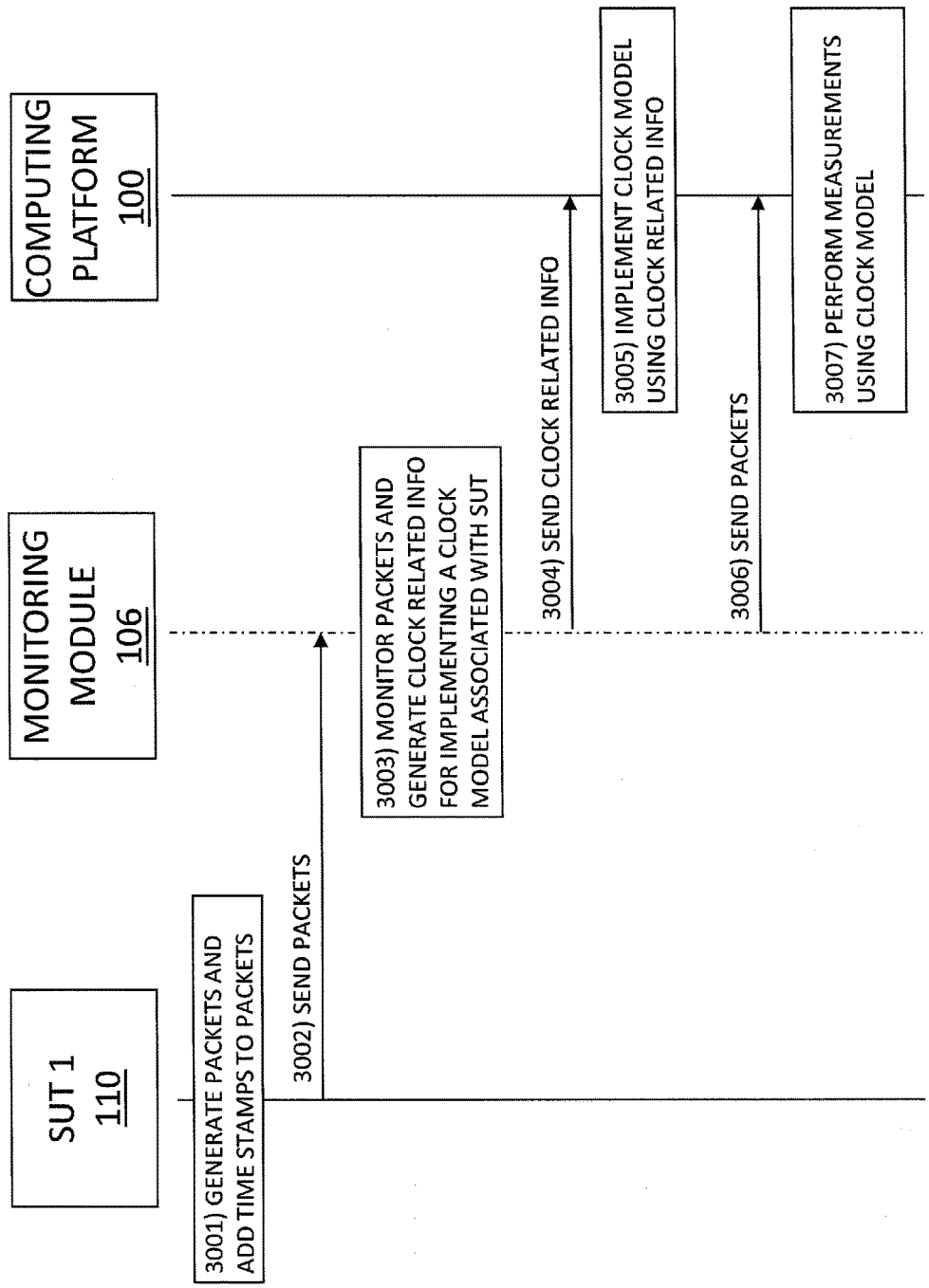
FIG. 3 is a message flow diagram illustrating exemplary communications associated with modeling a clock according to an embodiment of the subject matter described herein.

FIG. 3 is a message flow diagram illustrating exemplary communications associated with modeling a clock according to an embodiment of the subject matter described herein. In some embodiments, SUT 110 may include a traffic generator or any functionality for generating and sending traffic to computing platform 100.

In step 3001, packets may be generated at SUT 110. Each of the packets may include a timestamp added by and/or associated with clock 114. For example, each packet may be a TCP packet and may include a timestamp parameter value representing a number of ms since the start of a reference time.

In step 3002, the packets may be sent from SUT 110 towards computing platform 100. For example, packets may be sent from SUT 110 via a port or path associated with computing platform 100.

In step 3003, the packets may be monitored as the packets traverse monitoring module 106 and clock related information for implementing a clock model associated with SUT 110 may be generated, obtained, and/or derived using the packets. For example, a clock period scale factor value and a relative phase offset value associated with clock 114 may be determined by monitoring module 106 using base clock 107.

In step 3004, clock related information may be sent from monitoring module 106 to computing platform 100. For example, clock related information may be sent to CMM 102.

In some embodiments, communications between monitoring module 106 and computing platform 100 may occur via a network (e.g., a management network) and/or path separate from a network or path use to send packets from SUT 110 to computing platform 100.

In step 3005, the clock model may be implemented at computing platform 100 using the clock related information. For example, CMM 102 may implement clock model 118 based on clock related information associated with clock 114.

In step 3006, the packets may be sent to computing platform 100 via monitoring module 106. For example, after traversing monitoring module 106, packets generated by SUT 110 may be sent to computing platform 100.

In step 3007, traffic related measurements may be performed using the clock model. In some embodiments, the clock model may be usable to generate a higher precision timestamp from a timestamp received in a packet. For example, computing platform 100 and/or a related entity may generate an adjusted timestamp using a 'time-of-transmit' timestamp from a received packet and the clock model. In this example, computing platform 100 and/or a related entity may compute one-way latency by subtracting the adjusted timestamp from a 'time-of-receipt' timestamp generated by a high precision clock at computing platform 100.

It will be appreciated that the communications depicted in FIG. 3 is for illustrative purposes and that different and/or additional actions may be used. For example, steps 3003-3005 may be omitted in some instance and/or may occur periodically. It will also be appreciated that various actions described herein may occur in a different order or sequence. For example, steps 3003, 3004, and/or 3005 may occur before or concurrently with step 3006.

FIG. 4 is a table illustrating exemplary data associated with modeling a clock according to an embodiment of the subject matter described herein. Data 400 may include any suitable clock related information, such as clock identifiers (IDs), clock period scale factor values, relative phase offset values, confidence values, packet IDs, and/or update flags, for generating a clock model and/or correlating two clocks. In some embodiments, data 400 may be obtained or derived from CMM 102, monitoring module 106, monitoring module 108, and/or other sources. In some embodiments, data 400 may be accessed by computing platform 100, CMM 102, and/or another entity and may be stored using various data structures (e.g., in CMM storage 104).

Referring to FIG. 4, data 400 may be depicted using one or more data structures representing associations between clock IDs and various types of clock related information, including clock period scale factor values, relative phase offset values, confidence values, packet IDs, and/or update flags. As depicted by values in a 'CLOCK ID' column in FIG. 4, data 400 may include information that identifies or represents clock models associated with particular SUTs. For example, each clock ID may be represented by a SUT or related node identifier and/or other identifying information.

As depicted by values in a 'SCALE FACTOR' column in FIG. 4, data 400 may include information that identifies or represents clock period scale factor values associated with particular clock models. For example, each clock period scale factor value may be an integer value, such as '500', '400', '100', or '1000'.

As depicted by values in a 'PHASE OFFSET' column in FIG. 4, data 400 may include information that identifies or represents relative phase offset values associated with particular clock models. For example, each relative phase offset value may be an integer value, such as '−2200', '4598', '200', or '−200'.

As depicted by values in a confidence value column in FIG. 4, data 400 may include information that identifies or represents a confidence value indicating how likely particular clock models are to be accurate. For example, each confidence value may be an integer value ranging from 0 to 100, such as '95', '80', '40', or '25'.

As depicted by values in a 'PACKET ID' column in FIG. 4, data 400 may include information that identifies or represents one or more packet IDs for identifying particular packets for obtaining additional clock related information. For example, each packet IDs value may indicate one or more portions of a packet for uniquely identifier the packet, such as 'a sequence number and a hash value of packet', 'a sequence number and a timestamp parameter value', or 'a sequence number and a timestamp parameter value'.

As depicted by values in a 'UPDATE FLAG' column in FIG. 4, data 400 may include information that indicates whether a clock model is becoming inaccurate and/or should be updated or recalibrated. For example, while 'UPDATE FLAG' data may be represented as a Boolean value in FIG. 4, information in various forms may be stored for determining whether to update particular clock models and/or to retrieve additional clock related information.

In some embodiments, another indicator in data 400 may indicate whether to perform a special packet-based clock model (re)calibration, e.g., by tracking and/or correlating clock related information associated with one or more particular packets (e.g., as indicated by packet IDs).

It will be appreciated that data 400 is for illustrative purposes and that different and/or additional information may be used for performing aspects associated with clock modeling.

Figure 5:
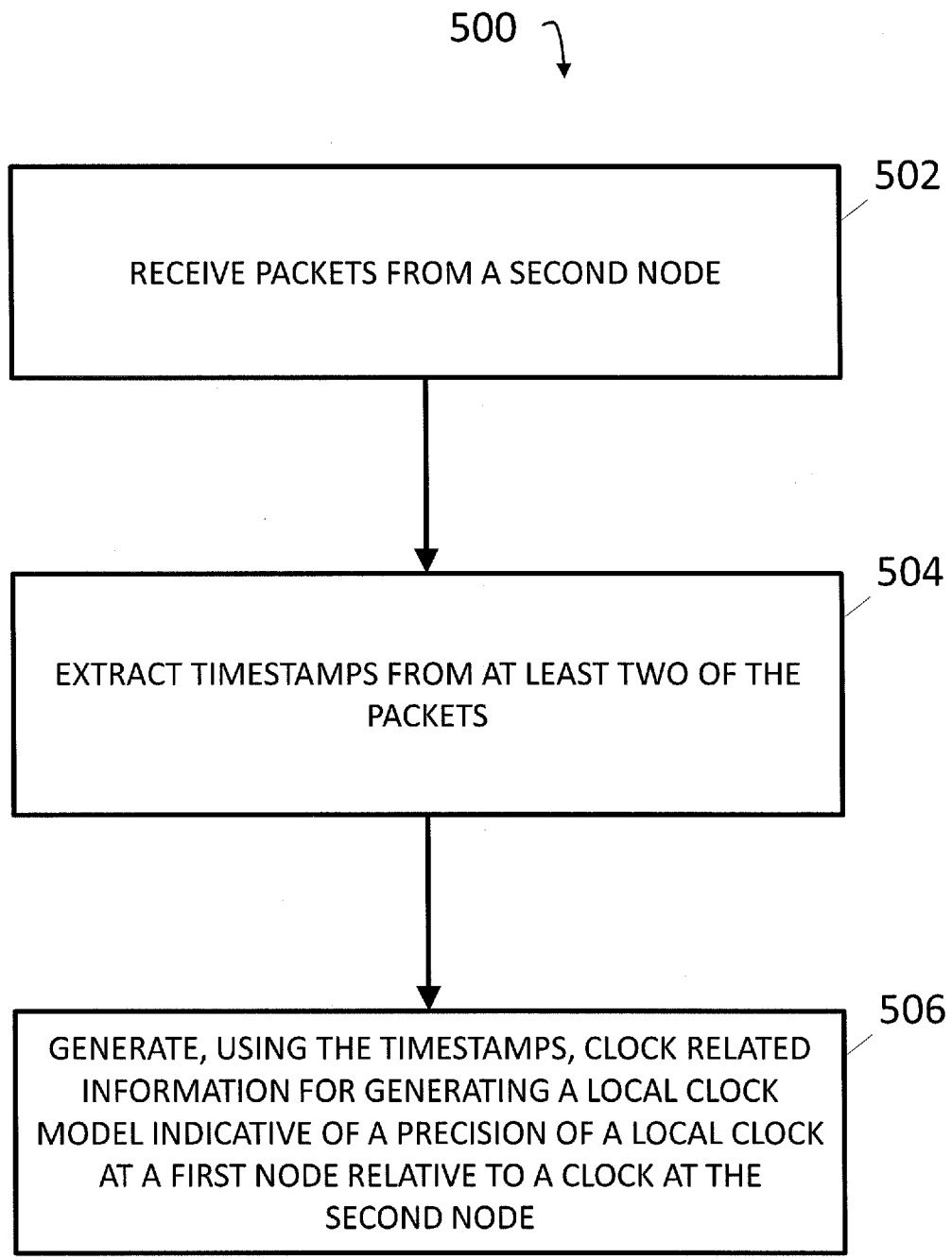
FIG. 5 is a flow chart illustrating an exemplary process for modeling a clock according to an embodiment of the subject matter described herein.

FIG. 5 is a flow chart illustrating an exemplary process 500 for modeling a clock according to an embodiment of the subject matter described herein. In some embodiments, exemplary process 500, or portions thereof, may be performed by or at computing platform 100, CMM 102, monitoring module 106, monitoring module 108, SUT 110, SUT 112, and/or another node or module. In some embodiments, exemplary process 500 may include steps 502, 504, and 506.

Referring to exemplary process 500, steps 502, 504, and 506 may occur at or be performed by a monitoring module (e.g., monitoring module 106) associated with a first node (e.g., computing platform 100).

In step 502, packets from a second node may be received.

In step 504, timestamps from at least two of the packets may be extracted.

In step 506, clock related information for generating a local clock model may be generated using the timestamps. The local clock model may be indicative of a precision of a local clock at the first node relative to a clock at the second node.

In some embodiments, an entity for implementing and/or using a clock model (e.g., monitoring module 106, computing platform 100, or another entity) may be configured to receive a first packet containing a transmit timestamp associated with a second node (e.g., SUT 110), to generate a receipt timestamp indicating when the first packet is received at the first node, to generate, using the clock model and the transmit timestamp, a time representation associated with the transmit timestamp that is more precise than the transmit timestamp, and to perform a traffic related measurement using the time representation or the clock model.

In some embodiments, performing a traffic related measurement may include computing one-way latency, jitter, and/or another traffic related measurement.

In some embodiments, computing one-way latency may include computing the difference between the receipt timestamp and the time representation.

In some embodiments, a node may be configured to perform a monitoring enhancement action in response to meeting or exceeding one or more threshold values associated with a traffic related measurement or a confidence value associated with a clock model.

In some embodiments, performing a monitoring enhancement action may include initiating modification of a first packet, initiating modification of a transmit timestamp in the first packet with timestamp information associated with a first node or a clock model, initiating copying of the first packet, initiating timestamped copying of at least a portion of the first packet, initiating utilization of one or more test packets for testing a second node, the first node, or a communications path, or initiating monitoring of subsequent packets sent from the second node to the first node using packet identifiers.

In some embodiments, an implemented clock model may be adjusted aperiodically or periodically.

In some embodiments, clock related information may include a clock period scale factor value for indicating a number of clock periods associated with a first clock (e.g., a high precision clock or base clock 107) that occurs during a clock period associated with a second clock (e.g., a low precision clock or clock 114) and a relative phase offset value for correlating the first clock and the second clock.

In some embodiments, a first node (e.g., computing platform 100) or a second node (e.g., SUT 110 or SUT 112) may include a device under test, a test platform, a test device, a source node, a destination node, a probe, a monitoring device, a logic device, a CPLD, an FPGA, and/or an ASIC.

In some embodiments, implementing a clock model may include implementing a linear model or a piecewise linear model of a high precision clock based on a low precision clock.

It will be appreciated that exemplary process 500 is for illustrative purposes and that different and/or additional actions may be used. It will also be appreciated that various actions described herein may occur in a different order or sequence.

It should be noted that computing platform 100, CMM 102, monitoring module 106, monitoring module 108, and/or functionality described herein may constitute a special purpose computing device. Further, computing platform 100, CMM 102, monitoring module 106, monitoring module 108, and/or functionality described herein can improve the technological field of passive monitoring of network nodes and/or related measurement systems (e.g., testing platforms) by providing mechanisms for modeling a clock and/or for using the clock model or related information to increase or improve precision and/or accuracy of traffic related measurements.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for modeling a clock, the method comprising:
   at a monitoring module associated with a first node:
      receiving packets from a second node;
      extracting timestamps from at least two of the packets; and
      generating, using the timestamps, clock related information for generating a local clock model indicative of a precision of a local clock at the first node relative to a clock at the second node, wherein the clock related information includes a clock period scale factor value for indicating a number of clock periods associated with a first clock that occur during a clock period associated with a second clock and a relative phase offset value for correlating the first clock and the second clock.

2. The method of claim 1 wherein the local clock model is adjusted aperiodically or periodically.

3. A method for modeling a clock, the method comprising:
   at a monitoring module associated with a first node:
      receiving packets from a second node;
      extracting timestamps from at least two of the packets; and
   generating, using the timestamps, clock related information for generating a local clock model indicative of a precision of a local clock at the first node relative to a clock at the second node; and
   at the monitoring module or the first node:
      generating the local clock model using the clock related information;
      receiving a first packet containing a transmit timestamp associated with the second node;
      generating a receipt timestamp indicating when the first packet is received at the first node;
      generating, using the local clock model and the transmit timestamp, a time representation associated with the transmit timestamp that is more precise than the transmit timestamp; and
      performing a traffic related measurement using the time representation or the local clock model.

4. The method of claim 3 wherein performing the traffic related measurement includes computing one-way latency, jitter, or another traffic related measurement.

5. The method of claim 4 wherein computing one-way latency includes computing the difference between the receipt timestamp and the time representation.

6. The method of claim 3 comprising:
   performing a monitoring enhancement action in response to meeting or exceeding one or more threshold values associated with the traffic related measurement or a confidence value associated with the clock model.

7. The method of claim 6 wherein performing the monitoring enhancement action includes initiating modification of the first packet, initiating modification of the transmit timestamp in the packet with timestamp information associated with the first node or the local clock model, initiating copying of the first packet, initiating a timestamped copying of at least a portion of the first packet, initiating utilization of one or more test packets for testing the second node, the first node, or a communications path or initiating monitoring of subsequent packets sent from the second node to the first node using packet identifiers.

8. A method for modeling a clock, the method comprising:
   at a monitoring module associated with a first node:
      receiving packets from a second node;
      extracting timestamps from at least two of the packets; and
      generating, using the timestamps, clock related information for generating a local clock model indicative of a precision of a local clock at the first node relative to a clock at the second node, wherein the second node or the first node includes a device under test, a test platform, a test device, a source node, a destination node, a probe, a monitoring device, a logic device, a complex programmable logic device (CPLD), a field-programmable gate array (FPGA), or an application specific integrated circuit (ASIC).

9. A system for modeling a clock, the system comprising:
   at least one memory;
   a monitoring module (MM) associated with a first node, wherein the MM is implemented using the at least one memory, wherein the MM is configured to:
      receive packets from the second node;
      extract timestamps from at least two of the packets; and
      generate, using the timestamps, clock related information for generating a local clock model indicative of a precision of a local clock at the first node relative to a clock at the second node, wherein the clock related information includes a clock period scale factor value for indicating a number of clock periods associated with a first clock that occur during a clock period associated with a second clock and a relative phase offset value for correlating the first clock and the second clock.

10. The system of claim 9 wherein the local clock model is adjusted aperiodically or periodically.

11. A system for modeling a clock, the system comprising:
    at least one memory;
    a monitoring module (MM) associated with a first node, wherein the MM is implemented using the at least one memory, wherein the MM is configured to:
       receive packets from the second node;
       extract timestamps from at least two of the packets; and
       generate, using the timestamps, clock related information for generating a local clock model indicative of a precision of a local clock at the first node relative to a clock at the second node,
    wherein the system is configured to:
       generate the local clock model using the clock related information;
       receive a first packet containing a transmit timestamp associated with the second node;
       generate a receipt timestamp indicating when the first packet is received at the first node;
       generate, using the local clock model and the transmit timestamp, a time representation associated with the transmit timestamp that is more precise than the transmit timestamp; and perform a traffic related measurement using the time representation or the local clock model.

12. The system of claim 11 wherein the first node is configured to perform the traffic related measurement by computing one-way latency, jitter, or another traffic related measurement.

13. The system of claim 12 wherein the first node is configured to compute one-way latency by computing the difference between the receipt timestamp and the time representation.

14. The system of claim 11 wherein the first node is configured to:
perform a monitoring enhancement action in response to meeting or exceeding one or more threshold values associated with the traffic related measurement or a confidence value associated with the local clock model.

15. The system of claim 14 wherein the first node is configured to perform the monitoring enhancement action by initiating modification of the first packet, initiating modification of the transmit timestamp in the packet with timestamp information associated with the first node or the local clock model, initiating copying of the first packet, initiating a timestamped copying of at least a portion of the first packet, initiating utilization of one or more test packets for testing the second node, the first node, or a communications path or initiating monitoring of subsequent packets sent from the second node to the first node using packet identifiers.

16. A system for modeling a clock, the system comprising:
at least one memory;
a monitoring module (MM) associated with a first node, wherein the MM is implemented using the at least one memory, wherein the MM is configured to:
receive packets from the second node;
extract timestamps from at least two of the packets; and
generate, using the timestamps, clock related information for generating a local clock model indicative of a precision of a local clock at the first node relative to a clock at the second node, wherein the second node or the first node includes a device under test, a test platform, a test device, a source node, a destination node, a probe, a monitoring device, a logic device, a complex programmable logic device (CPLD), a field-programmable gate array (FPGA), or an application specific integrated circuit (ASIC).

17. A non-transitory computer readable medium comprising executable instructions thereon that when executed by a processor of a computer perform steps comprising:
at a monitoring module associated with a first node:
receiving packets from a second node;
extracting timestamps from at least two of the packets; and
generating, using the timestamps, clock related information for generating a local clock model indicative of a precision of a local clock at the first node relative to a clock at the second node, wherein the clock related information includes a clock period scale factor value for indicating a number of clock periods associated with a first clock that occur during a clock period associated with a second clock and a relative phase offset value for correlating the first clock and the second clock.

18. A non-transitory computer readable medium comprising executable instructions thereon that when executed by a processor of a computer perform steps comprising:
at a monitoring module associated with a first node:
receiving packets from a second node;
extracting timestamps from at least two of the packets; and
generating, using the timestamps, clock related information for generating a local clock model indicative of a precision of a local clock at the first node relative to a clock at the second node; and
at the monitoring module or the first node:
generating the local clock model using the clock related information;
receiving a first packet containing a transmit timestamp associated with the second node;
generating a receipt timestamp indicating when the first packet is received at the first node;
generating, using the local clock model and the transmit timestamp, a time representation associated with the transmit timestamp that is more precise than the transmit timestamp; and
performing a traffic related measurement using the time representation or the local clock model.

* * * * *